(12) United States Patent
Wright et al.

(10) Patent No.: US 11,019,762 B2
(45) Date of Patent: Jun. 1, 2021

(54) PRECISION DEPTH CONTROL OF SEED PLANTING UNITS OF AN AGRICULTURAL IMPLEMENT

(71) Applicant: CNH Industrial Canada, Ltd., Saskatoon (CN)

(72) Inventors: Jared S. Wright, Saskatoon (CA); Corey Neal Marciniuk, Saskatoon (CA)

(73) Assignee: CNH Industrial Canada, Ltd., Saskatoon (CA)

( * ) Notice: Subject to any disclaimer, the term of this patent is extended or adjusted under 35 U.S.C. 154(b) by 156 days.

(21) Appl. No.: 16/033,552

(22) Filed: Jul. 12, 2018

(65) Prior Publication Data

US 2020/0015406 A1  Jan. 16, 2020

(51) Int. Cl.
*A01B 63/00* (2006.01)
*A01C 5/06* (2006.01)
*A01B 76/00* (2006.01)
*A01B 63/22* (2006.01)

(52) U.S. Cl.
CPC ............ *A01B 63/008* (2013.01); *A01B 63/22* (2013.01); *A01B 76/00* (2013.01); *A01C 5/062* (2013.01); *A01C 5/068* (2013.01)

(58) Field of Classification Search
CPC ..... A01B 63/008; A01B 63/002; A01B 63/00; A01B 63/22; A01B 63/16; A01B 63/14; A01B 76/00; A01C 5/062; A01C 5/06; A01C 5/00; A01C 5/068; A01C 5/066
See application file for complete search history.

(56) References Cited

U.S. PATENT DOCUMENTS

| | | |
|---|---|---|
| 3,245,477 A | 4/1966 | Wilcox |
| 4,100,538 A | 7/1978 | Knepler |
| 4,646,620 A | 3/1987 | Buchl |
| 5,366,024 A | 11/1994 | Payne |
| 5,757,640 A | 5/1998 | Monson |
| 5,931,882 A | 8/1999 | Fick et al. |
| 6,164,385 A | 12/2000 | Buchl |
| 6,165,089 A * | 12/2000 | McGreal ............... F16H 7/1263 474/101 |

(Continued)

OTHER PUBLICATIONS

TOPCON, X Console Family, State-of-the-art-in-cab Consoles, 2016, 4 pages. https://www.topconpositioning.com/sites/default/files/product_files/xconsoles_broch_7010_2147_revb_sm.pdf.

(Continued)

*Primary Examiner* — Christopher J. Novosad
(74) *Attorney, Agent, or Firm* — Rebecca L. Henkel; Rickard K. DeMille

(57) ABSTRACT

A method of precision depth control for seed planting units of an agricultural implement. The agricultural implement can include a plurality of seed planting units, with each seed planting unit being configured to provide an individually adjustable depth setting and having a visual indicator associated therewith. The method can include receiving a selection of a seed planting unit of the plurality of seed planting units, visually indicating the selected seed planting unit with the visual indicator associated therewith, receiving depth adjustment data for the selected seed planting unit, and adjusting the depth of the selected seed planting unit based on the depth adjustment data.

9 Claims, 8 Drawing Sheets

(56) References Cited

U.S. PATENT DOCUMENTS

| | | | |
|---|---|---|---|
| 6,701,857 | B1 | 3/2004 | Jensen et al. |
| 8,235,130 | B2 | 8/2012 | Henry et al. |
| 8,857,530 | B2 | 10/2014 | Henry |
| 8,935,986 | B2 | 1/2015 | Blomme et al. |
| 9,232,687 | B2 | 1/2016 | Bassett |
| 9,351,443 | B2 | 5/2016 | Miller et al. |
| 9,357,692 | B2 | 6/2016 | Johnson et al. |
| 2004/0025764 | A1* | 2/2004 | Friestad ............... F16D 1/10 111/158 |
| 2004/0025765 | A1* | 2/2004 | Friestad ............... A01C 19/00 111/158 |
| 2010/0319941 | A1 | 12/2010 | Peterson |
| 2014/0000919 | A1 | 1/2014 | Bachman et al. |
| 2015/0230391 | A1 | 8/2015 | Houck |
| 2016/0157413 | A1 | 6/2016 | Kowalchuk et al. |

OTHER PUBLICATIONS

Raven Industries, Raven Product Guide, Raven Precision, 2016, 48 Pages. http://ravenprecision.com/assets/users/general/Raven_Product_Guide_Spring_2016_WEB.pdf.

Touchset, Depth Control, 2010, 1 Page. http://salesmanual.deere.com/sales/salesmanual/en_NA/secondary_tillage/2009/feature/disks_and_field_cultivators/touchset-depth_control_all_machines.html?sbu=ag&link=prodcat.

\* cited by examiner

PRECISION DEPTH CONTROL OF SEED PLANTING UNITS OF AN AGRICULTURAL IMPLEMENT

FIELD OF THE INVENTION

The present subject matter relates generally to agricultural implements, and more specifically, to a seed planting unit of an agricultural implement with precision depth control.

BACKGROUND OF THE INVENTION

Generally, agricultural seed planting units are towed behind a tractor or other work vehicle via a mounting bracket secured to a rigid frame of an agricultural implement, such as a planter or seeder. These seed planting units typically include a ground engaging tool or opener that forms a furrow seed planting trench for seed deposition into the soil. Specifically, the opener is used to break the soil to enable seed deposition. After the seed is deposited, the opener is followed by a packer wheel that packs the soil on top of the deposited seed. The packer wheel also serves to adjust the penetration depth of the opener within the soil. In certain configurations, the penetration depth of the opener is adjustable by varying a vertical position of the packer wheel relative to the opener.

In typical configurations, the packer wheel is pivotally coupled to a packer support structure by a packer arm. Rotation of the packer arm relative to the packer support structure varies the vertical position of the packer wheel, thereby, in turn, adjusting the penetration depth of the opener. In certain configurations, the packer arm includes a series of openings configured to receive a fastener. The openings are positioned such that the angle of the packer arm relative to the packer support structure may be varied by securing the fastener to a particular opening. However, removing the fastener from one opening, rotating the packer arm relative to the packer support structure, and securing the fastener within another opening is a time consuming process. Furthermore, certain agricultural implements have multiple seed planting units, and therefore have multiple openers (e.g., greater than 50, 60, 70, 80, 90, or more). Because the openers are typically configured to maintain the same penetration depth setting, the duration of the depth adjustment process is multiplied by the number of openers coupled to the implement. Consequently, reconfiguration of the implement for a different penetration depth setting may result in large delays in seeding operations, thereby decreasing seeding efficiency.

Accordingly, a seed planting unit for use within an agricultural implement that allows for more efficient reconfiguration of the depth settings of the implement's openers would be welcomed in the technology.

BRIEF DESCRIPTION OF THE INVENTION

Aspects and advantages of the invention will be set forth in part in the following description, or may be obvious from the description, or may be learned through practice of the invention.

In one aspect, the present subject matter is directed to a method of precision depth control for seed planting units of an agricultural. The agricultural implement can include a plurality of seed planting units, with each seed planting unit being configured to provide an individually adjustable depth setting and having a visual indicator associated therewith. The method can include receiving a selection of a seed planting unit of the plurality of seed planting units, visually indicating the selected seed planting unit with the visual indicator associated therewith, receiving depth adjustment data for the selected seed planting unit, and adjusting the depth of the selected seed planting unit based on the depth adjustment data.

In another aspect, the present subject matter is directed to an agricultural implement. The agricultural implement can include a frame and a plurality of seed planting units supported by the frame. The plurality of seed planting units can be configured to deposit seeds within a field as the implement is moved across the field. Each seed planting unit can include a ground engaging tool configured to penetrate a soil surface of the field, a wheel support arm coupled to a support structure of the seed planting unit, and a wheel rotatably supported by the wheel support arm. The wheel can be configured to contact the soil surface to define a penetration depth setting for the ground engaging tool relative to the soil surface. Each seed planting unit can also include a depth adjustment system configured to selectively adjust a vertical position of the wheel relative to the ground engaging tool to vary the penetration depth setting. The agricultural implement can further include a plurality of visual indicators, with each visual indicator of the plurality of visual indicators being proximate an associated seed planting unit and being configured to visual indicate at least one of that the depth adjustment system is selectively engaged, that the vertical position of the wheel is being actively adjusted, or that the vertical position of the wheel has been successfully adjusted.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

DETAILED DESCRIPTION OF THE INVENTION

Figure 1:
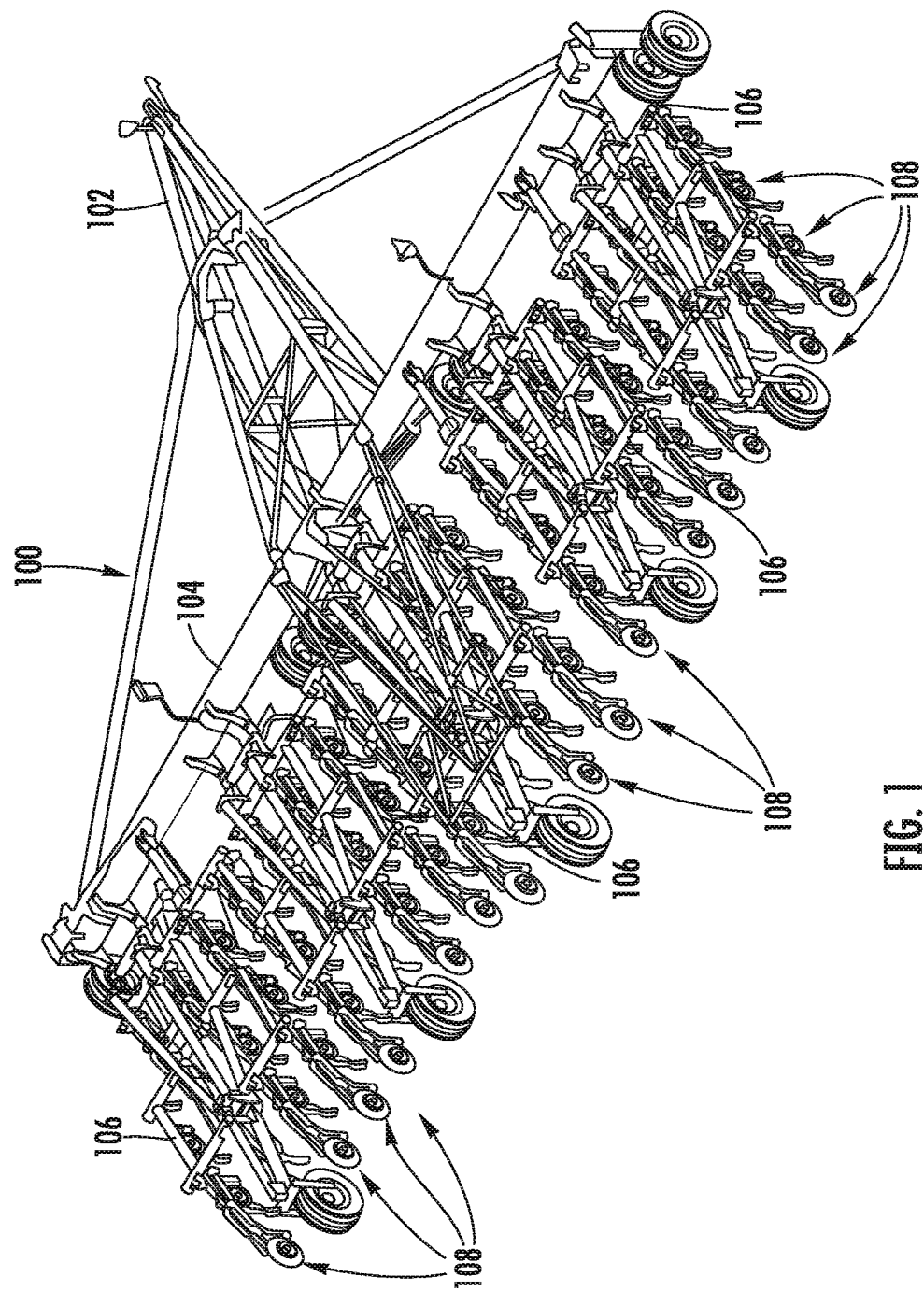
FIG. 1 illustrates a perspective view of one embodiment of an agricultural implement including multiple seed planting units in accordance with aspects of the present subject matter.

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

In general, the present subject matter is directed to a seed planting unit for an agricultural implement. In several embodiments, the implement may correspond to a planter or seeder and may include a plurality of seed planting units coupled to or otherwise supported by a frame of the planter/seeder. In one embodiment, each seed planting unit may include a ground engaging tool configured to open the soil surface to create a seed trench or furrow, and a wheel rotatably supported by a corresponding wheel support arm of the seed planting unit, with the wheel being configured to roll across or otherwise contact the soil surface to set a penetration depth of the ground engaging tool, as well as to close the seed trench upon deposition of seeds therein.

Additionally, in accordance with aspects of the present subject matter, each seed planting unit may be configured to allow a penetration depth setting for the ground engaging tool to be adjusted. Specifically, the seed planting unit may include a depth adjustment system having one or more depth adjustment components configured to adjust the vertical position of the wheel relative to the ground engaging tool, which, in turn, may result in a corresponding adjustment in the penetration depth setting. As such, the depth adjustment components(s) may be used to set the desired penetration depth for the ground engaging tool based on, e.g., the soil composition or seed type, to allow for more efficient and/or effective seeding operations.

In several embodiments, the depth adjustment component(s) of the seed planting unit may include a depth adjustment lever configured to selectively rotate or pivot relative to the wheel support arm. As will be described below, the wheel support arm and the depth adjustment lever may automatically adjust the depth of one or more seed planting units, with an infinitely variable depth setting. Each seed planting unit may include an electronically controlled actuator coupled to the depth adjustment lever (e.g., a fluid-driven actuator or solenoid-driven actuator). In such an embodiment, the actuator may be configured to be selectively controlled to actuate the depth adjustment lever so as to move the lever relative to the wheel support arm, thereby permitting the penetration depth setting for the ground engaging tool to be adjusted automatically.

In accordance with aspects of the present subject matter, the depth adjustment system may communicate with a controller or other device to illuminate or otherwise visually indicate certain information to the operator related to the operation of the depth adjustment system and/or the selection of a given seed planting unit(s). For example, in one embodiment, the visual indicators described herein may be used to indicate at least one of: that the depth adjustment system for a given seed planting unit(s) is selectively engaged, that the vertical position of the wheel is being actively adjusted, or that the vertical position of the wheel has been successfully adjusted. Additionally, multiple forms of visual indication including, but not limited to, flashing, intermittent color changes, solid color changes, and other visual indications may be used to communicate a plurality of information to an operator of an agricultural implement utilizing the seed planting units described herein.

In one embodiment, a computer-implemented graphical user interface may be provided to allow a visual indication from within the cabin of a work vehicle towing an agricultural implement or from a remote work station, such as a computer terminal. The graphical user interface may also include input elements allowing for remote control of the seed planting units and associated depth control systems. Moreover, the input elements may allow selection of one or more rows of seed planting units to be adjusted simultaneously or substantially simultaneously, with a visual indication provided to the operator through the graphical user interface.

In one embodiment, a physical remote or human-machine interface may be provided to allow an operator of the agricultural implement to precisely adjust the depth of one or more seed planting units from within the cabin or from a location exterior of the cabin of the work vehicle. The physical remote or human-machine interface may be a hard-wired remote unit, a wireless remote unit, or a combination remote unit allowing wired communication if an issue arises in wireless communication. Moreover, the physical remote or human-machine interface may allow selection of one or more rows of seed planting units to be adjusted simultaneously or substantially simultaneously, with a visual indication provided to the operator in the form of individual visual indicators arranged on or proximate associated seed planting units.

It should be appreciated that, in accordance with aspects of the present subject matter, the position of the depth adjustment system and/or actuator relative to the wheel support arm may be adjusted automatically to vary the depth penetration setting for the ground engaging tool. However, manual adjustment systems may also be included in combination with the above-described elements. For instance, in one embodiment, an operator may be allowed to manually adjust the positioning of the depth adjustment system through use of a lever (e.g., using an actuatable handle of a depth adjustment lever) or specialized tool used to engage the automatic depth adjustment system and/or actuator.

Referring now to the drawings, FIG. 1 illustrates a perspective view of one embodiment of an agricultural implement 100. In general, the implement 100 is configured to be towed behind a work vehicle, such as a tractor (not shown). As shown in FIG. 1, the implement 100 may include a tow bar assembly 102, which is shown in the form of an A-frame hitch assembly. The tow bar assembly 102 may include a hitch configured to attach to an appropriate tractor hitch via a ball, clevis, or other coupling. Additionally, the tow bar assembly 102 may be coupled to a tool bar 104, which, in turn, supports multiple tool frames 106. Moreover, in several embodiments, each tool frame 106 may include multiple seed planting units 108, such as a plurality of hoe openers, coupled thereto or supported thereby. As discussed in detail below, each seed planting unit 108 may be configured to facilitate quick and efficient reconfiguration of the associated seed planting unit 108 for varying penetration depth settings in accordance with aspects of the present subject matter.

It should be appreciated that the configuration of the implement 100 described above and shown in FIG. 1 is provided only to place the present subject matter in an exemplary field of use. Thus, it should be appreciated that the present subject matter may be readily adaptable to any manner of implement configuration.

Figure 2:
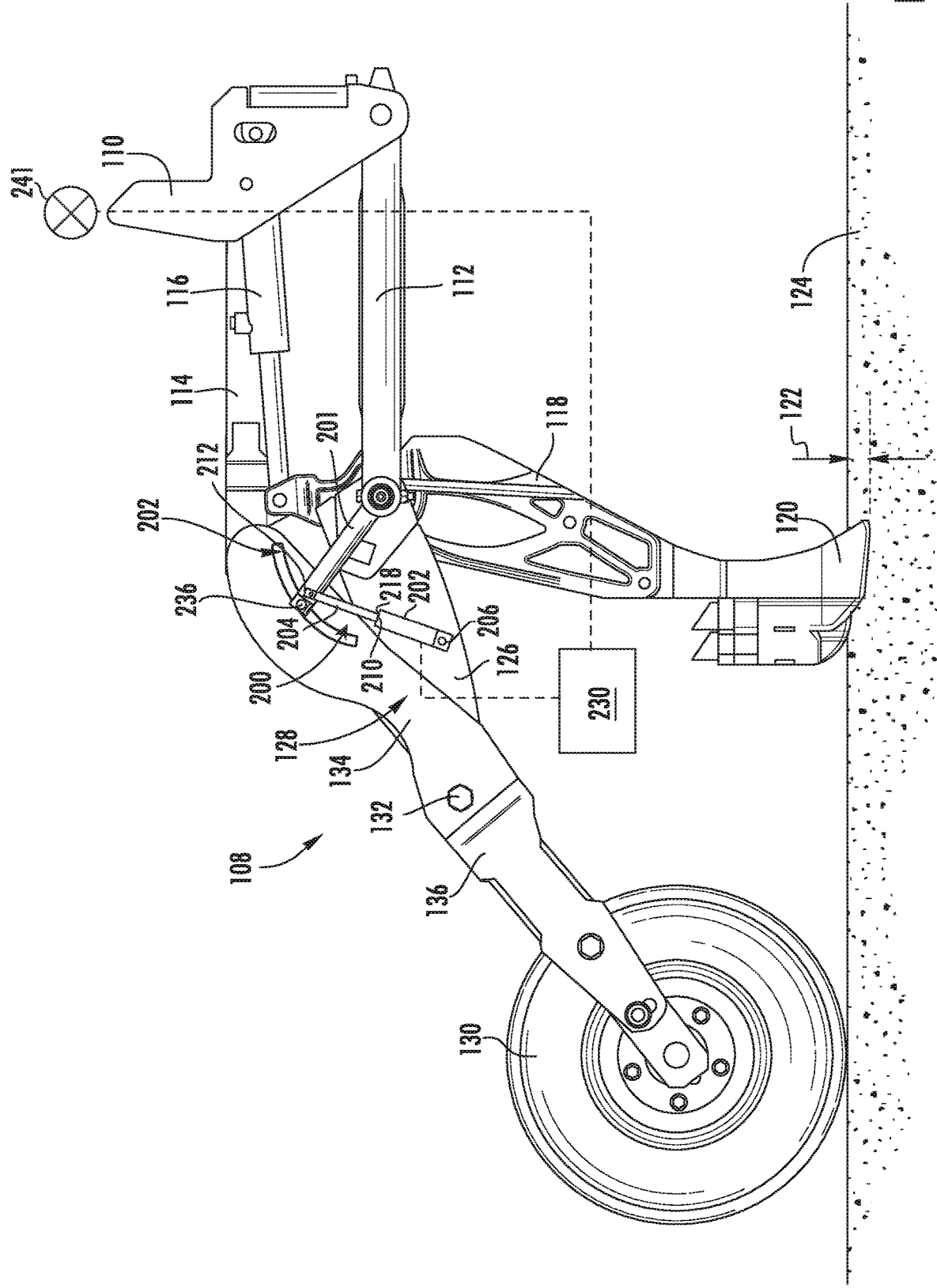
FIG. 2 illustrates a side view of one embodiment of a seed planting unit suitable for use within the agricultural implement shown in FIG. 1 in accordance with aspects of the present subject matter, particularly illustrating the seed planting unit including a support member, a ground engaging tool, a wheel support arm, a wheel, and a depth adjustment means.

Referring now to FIG. 2, a side view of one embodiment of a seed planting unit 108 suitable for use within an agricultural implement (e.g., the implement 100 shown in FIG. 1) is illustrated in accordance with aspects of the present subject matter, particularly illustrating depth adjustment components or elements of the seed planting unit 108 configured to facilitate reconfiguration of the unit's penetration depth setting. It should be appreciated that, although the seed planting unit 108 is shown and described herein as corresponding to a hoe opener, the seed planting unit 108 may generally correspond to any suitable row unit having any suitable configuration that facilitates the deposition of seeds within the soil. Additionally, it should be appreciated that, although the seed planting unit 108 will generally be described in the context of the implement 100 shown in FIG. 1, the unit 108 may generally be configured to be installed on any suitable implement having any suitable implement configuration.

As shown in FIG. 2, the seed planting unit 108 includes a mounting bracket 110, a first linkage member 112, a second linkage member 114, and a biasing device or actuator, such as a cylinder 116 (e.g., hydraulic and/or pneumatic piston-cylinder assembly). In one embodiment, the cylinder 116 may be hydraulically coupled to a power supply that provides a flow of pressurized hydraulic fluid which displaces a piston rod extending from the cylinder. The mounting bracket 110 and associated hardware are generally configured to interface with the tool frame 106 (FIG. 1), thereby securing the seeding planting unit 108 to the implement 100 (FIG. 1). For instance, multiple seed planting units 108 may be mounted in parallel along the tool frame 106 (FIG. 1) to form a seeding assembly or unit. In the illustrated embodiment, the first linkage member 112, the second linkage member 114, and the mounting bracket 110 generally form elements of a parallel linkage, also known as a four bar linkage. As will be appreciated, components of the seed planting unit 108, such as the mounting bracket 110 (and associated hardware), first linkage member 112, and second linkage member 114, may be made of any suitable material, such as steel.

As shown in FIG. 2, the cylinder 116 may be attached to a shank 118 via a pin at the end of the piston rod. A ground engaging tool, such as the illustrated opener 120, is also attached to the shank 118 and is configured to engage the soil. Contact force between the opener 120 and the soil establishes a moment about a shank pivot joint. This moment is resisted by the force applied to the shank 118 by the cylinder 116. Furthermore, the linkage is configured to facilitate vertical movement of the implement 100, while maintaining the opener 120 at a desired penetration depth setting 122 within the soil 124. The desired penetration depth setting 122 may be selected based on soil conditions, or environmental factors, among other considerations. As illustrated, the linkage is coupled to a wheel support structure, such as the illustrated support structure 126.

A wheel support arm 128, including a packer wheel 130, is pivotally coupled to the support structure 126 by a pin 132 disposed through openings within the wheel support arm 128 and the support structure 126. The pin 132 is generally positioned at an interface between an upper portion 134 and a lower portion 136 of the wheel support arm 128. The packer wheel 130 is rotatably coupled to the lower portion 136 of the wheel support arm 128 and is configured to roll along or otherwise contact the soil surface to both pack the soil on top of deposited seeds and limit the penetration depth setting 122 of the opener 120. The pin 132 enables rotation of the wheel support arm 128 with respect to the support structure 126. However, in a working mode, rotation of the wheel support arm 128 relative to the support structure 126 is blocked by selective engagement of a depth adjustment lever 201 with the wheel support arm 128 as controlled by a depth control system 230.

As discussed in detail below, the depth adjustment lever 201 is configured to be pivoted or otherwise moved relative to the wheel support arm 128 (e.g., using an actuator 200) when it is desired to adjust the penetration depth setting 122 of the opener 120. Specifically, in several embodiments, the depth adjustment lever 201 (hereinafter also referred to as "lever 201") is configured to be slidably or movably engaged within a depth adjustment slot 203 formed within the wheel support arm 128 such that movement of the lever 201 relative to the wheel support arm 128 results in the upper portion 134 of the wheel support arm 128 being raised or lowered, which, in turn, varies the vertical positioning of the opener 120 relative to the packer wheel 130, thereby altering the penetration depth setting of the opener 120. Once a desired penetration depth setting 122 has been established, the lever 201 may be retained in position relative to the wheel support arm 128 using the actuator 200, thereby limiting rotation of the wheel support arm 128 and enabling the seed planting unit 108 to enter the working mode. Generally, the lever 201 may be configured to be adjusted in position relative to the wheel support arm by actuator 200. As previously discussed, the packer wheel 130 rotates across a surface of the soil to limit or set the penetration depth setting 122 of the opener 120. Consequently, the difference in vertical position between the packer wheel 130 and the opener 120 defines the penetration depth setting 122 of the opener 120 within the soil 124.

As will be described below, upon selection or adjustment, during adjustment, and/or after adjustment, a visual indicator 241 may be illuminated or otherwise provide a visual indication that the seed planting unit 108 is selected for adjustment, is being adjusted, or has been adjusted. The depth control system 230 may communicate with a controller or other device to illuminate or otherwise visually indicate certain information to the operator related to the operation of the depth adjustment system and/or the selection of a given seed planting unit(s) using the visual indicator 241. For example, in one embodiment, the visual indicator 241 may be used to indicate at least one of: that the depth adjustment system for a given seed planting unit(s) is selectively engaged, that the vertical position of the wheel is being actively adjusted, or that the vertical position of the wheel has been successfully adjusted.

Figure 3:
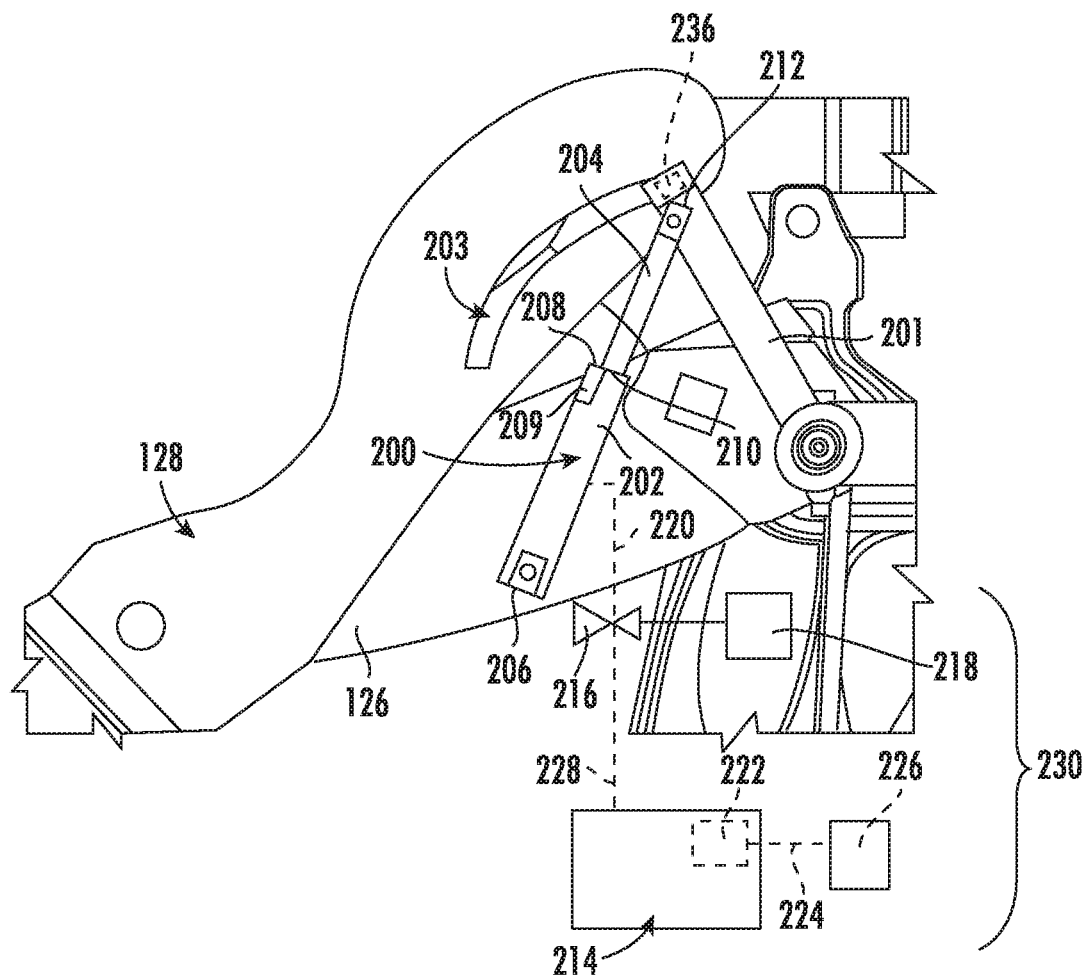
FIG. 3 illustrates a partial, side view of the seed planting unit shown in FIG. 2, particularly illustrating the seed planting unit including an actuator configured as the depth adjustment means to vertically adjust the wheel relative to the wheel support arm in accordance with aspects of the present subject matter.

Referring now to FIG. 3, a partial, side view of the seed planting unit shown in FIG. 2 and described above is illustrated in accordance with aspects of the present subject matter. As discussed briefly above, the depth adjustment lever 201 is configured to be pivoted or otherwise moved by the actuator 200 relative to the wheel support arm 128 when it is desired to adjust the penetration depth setting 122 of the opener 120. Further, the depth adjustment lever 201 may be configured to be selectively locked relative to the wheel support arm 128 by the actuator 200 to prevent further relative pivotal movement of the alternate depth adjustment lever 201, thereby setting the desired penetration depth for the opener 120.

In the illustrated embodiment, the wheel support 128 arm includes the depth adjustment slot 203 arranged as an arcuate slot extending about an axis of rotation of the lever 201. As further illustrated, the lever 201 includes a base portion having a guide pin 236 configured to be movably received within the depth adjustment slot 203. As such, the lever 201 may be selectively rotated relative to the wheel support arm 128 by the actuator 200 to slide or roll the guide pin 236 along the depth adjustment slot 203 to adjust the penetration depth setting of the opener 120.

As shown in FIG. 3, the actuator 200 includes a base cylinder 202 and an actuating arm 204. The base cylinder 202 extends between a first cylinder end 206 and a second cylinder end 208, in proximal relation to a position sensor 209, and with the actuator 200 being rotatably mounted to the support structure 126 of the seed planting unit 108 at the first cylinder end 206. Additionally, the actuating arm 204 generally extends between a first arm end 210 and a second arm end 212, with the first arm end 210 being receivable within the base cylinder 202 and the second arm end 212 being rotatably coupled to the lever 201 generally adjacent the guide pin 236. As such, movement of the actuating arm 204 relative to the base cylinder 202 causes the guide pin 236 to slide or roll within the depth adjustment slot 203 such that the wheel support arm 128 rotates to adjust the penetration depth setting of the opener 120. Furthermore, movement of the base cylinder 202 proximate the position sensor 209 allows for position feedback and sensing of faults in the depth adjustment mechanisms illustrated.

Although shown as being coupled to the support structure 126, the same can be varied in that the actuator 200 can also be coupled at its first cylinder end 206 to the wheel support arm 128 instead of to the support structure 126. Furthermore, it should be appreciated that, in general, the actuator 200 may be coupled between the lever 201 and any other suitable component that allows the actuator 200 to function as described herein (e.g., to allow the actuator 200 to actuate the lever 201 relative to the wheel support arm 128). Accordingly, all such modifications are within the scope of this disclosure.

As indicated above, one example of a depth adjustment system comprising an actuator 200 and an associated depth adjustment lever 201 has been described in detail. However, it should be understood that other arrangements of depth control systems are also suitable and are intended to be included within the scope of this disclosure. Accordingly, while particular example operations are given with reference to the motion of the actuator 200 and/or the lever 201, it should be understood that equivalent actions and motions can be provided by a variety of mechanisms, including a worm-driven roller, rack and pinion arrangements, solenoid arrangements, position-aware motor arrangements, stepper motor arrangements, servo-motor arrangements, or other equivalent mechanisms and arrangements of multiple mechanisms.

In several embodiments, the operation of the actuator 200 (or any equivalent depth control mechanism) may be electronically controlled via the depth control system 230. For example, the actuator 200 may be actuated and locked by a controller 214, such as any suitable processor-based device(s) having a processor and a memory configured to store computer-readable instructions that can be executed by the processor. In such an embodiment, the controller 214 may be configured to control the operation of one or more components that regulate the actuation of the actuating arm 204 relative to the cylinder 202. For example, the controller may be communicatively coupled to one or more control valve(s) 216 configured to regulate the supply of fluid 218 (e.g., hydraulic fluid or air) to the actuator 200. In such instance, the control valve(s) may be fluidly connected to the actuator 200 through a hydraulic line(s) 220.

Moreover, the controller 214 may also include a communications interface 222 to provide a means for the controller 214 to communicate with any of the various other system components of the agricultural implement and/or any components of the work vehicle towing the implement. For instance, one or more communication links or interfaces 224 may be provided between the communications interface 222 and a user interface 226 to allow the controller to receive input signals from the user interface 226. The user interface 226 may be configured to receive information from the operator such as, but not limited to, information regarding the desired penetration depth setting for the opener 120, and to send input signals to the communications interface 222 via the communication link(s) 224 for providing a visual indication of depth setting adjustments at visual indicator 241. Similarly, one or more communicative links or interfaces 228 may be provided between the communications interface 222 and the actuator(s) 200 (and/or a related component configured to control the operation of the actuator(s) 200, such as a related control valve(s) 216) to allow the operation of the actuator(s) 200 to be controlled by the controller 214.

By configuring the seed planting unit 108 to have an electronically controlled actuator or mechanism, such as the actuator 200 described above with reference to FIGS. 2 and 3, the penetration depth of the seed planting unit 108 may be adjusted automatically (i.e., without manual manipulation of the lever 201). In such a way, the time required to adjust the penetration depth may be reduced significantly, thus increasing seeding efficiency. For example, in instances in which each seeding 108 includes an associated actuator 200, the operator may provide an input (via the interface 226) instructing the controller 214 to control the operation of the various actuators 200 such that the penetration depth setting for each opener 120 of the implement is adjusted to a given operator-selected setting. In addition, by using the disclosed actuator 200, the penetration depth setting for each opener 120 may be infinitely variable between the opposed ends of the depth adjustment slot 203.

As described above, individual seed planting units 108 may include actuators 200 and associated depth control systems 230 configured to adjust the depth settings associated therewith. The depth control systems 230 may also provide a visual indication of depth adjustment operations. It is noted that although described as being arranged on a particular agricultural implement, the components described above may be arrangement differently. For example, according to at least one embodiment, a system for depth adjustment may be provided that includes one or more visual indicators 241, the controller(s) 230, and sensor 209 configured to be provided in association with an agricultural implement for depth control feedback and other feedback. In this manner, the system for depth adjustment may be obtained and installed on a variety of agricultural implements utilizing adjustment mechanisms, including those not particularly associated with depth, such as offset mechanisms, row-spacing mechanisms, and other such mechanisms.

Hereinafter, a more detailed discussion of depth adjustment operations of an agricultural implement are described in detail.

Figure 4:
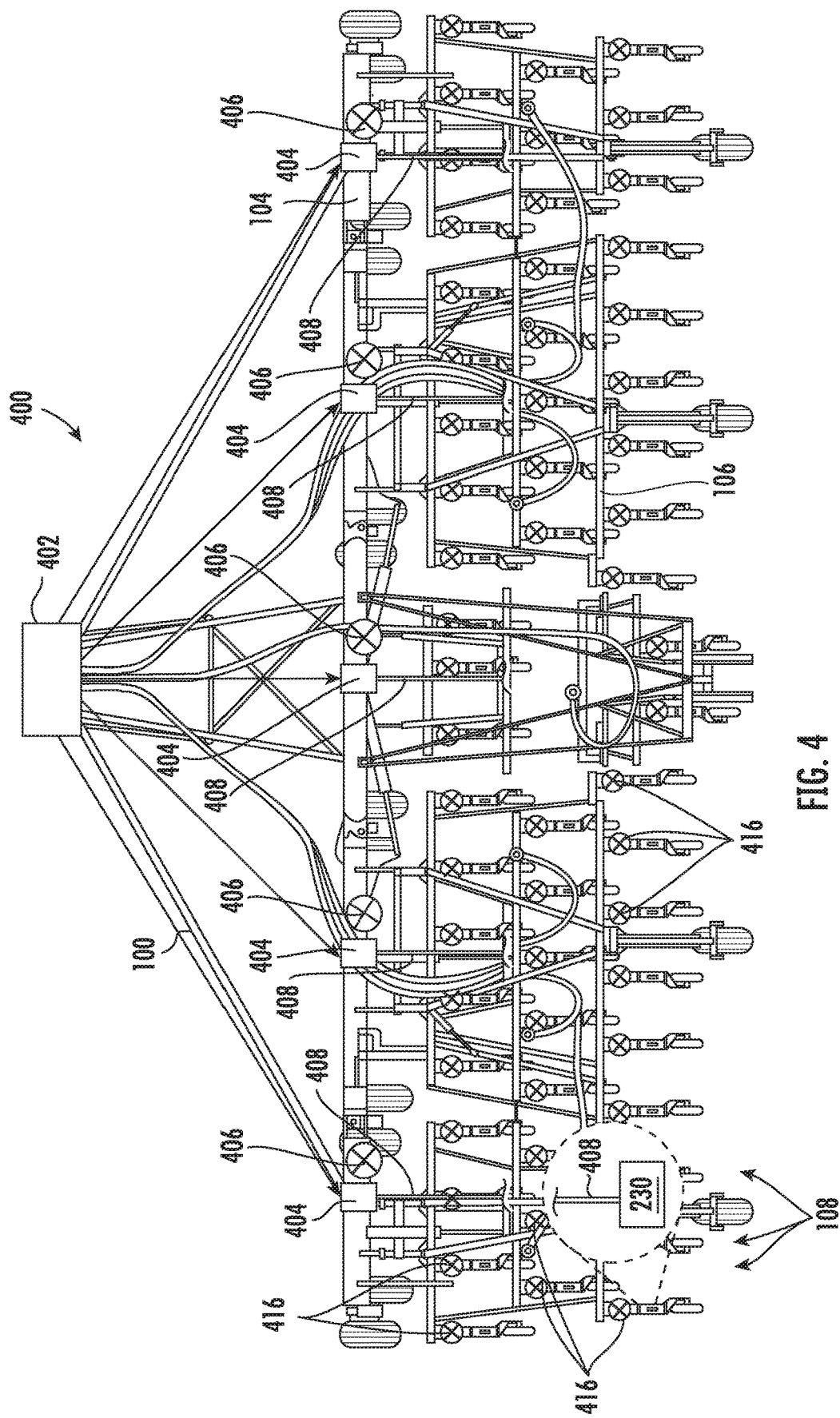
FIG. 4 illustrates a plan view of the agricultural implement shown in FIG. 1, particularly illustrating an embodiment of the implement including a plurality of visual indicators provided in association with the seed planting units of the implement in accordance with aspects of the present subject matter.

Turning to FIG. 4, a plan view of the agricultural implement 100 shown in FIG. 1 is illustrated in accordance with aspects of the present subject matter, particularly illustrating the implement 100 including a plurality of visual indicators 416 associated therewith. As shown, the agricultural implement 100 may include a main control module 402. The main control module may be an electronic module configured to provide communications to/from the individual depth control systems 230 of the various seed planting units 108 described above. In one embodiment, the main control module 402 may be in operative communication with sub-control modules 404 and depth control systems 230 over communications interface 408. Each sub-control module 404 may be arranged substantially similar to the main control module 402, and may be configured to communicate with one or more depth control systems 230 of a given subset of the seed planting units 108 over the communication interface 408. Accordingly, the main control module 402 may transmit depth adjustment data to one or more sub-control modules 404 for controlling one or more individual seed planting units associated with each sub-control module simultaneously. Alternatively, the main control module 402 may transmit depth adjustment data directly to a particular seed planting unit.

As further shown in FIG. 4, each sub-control module 404 includes a visual indicator 406 associated therewith. In one embodiment, the visual indicators 406 may be lighting devices (e.g., lamps, light emitting diodes (LEDs), etc.), or other visual indicators capable of visually indicating a change in status of one or more seed planting units. Similarly, in one embodiment, each individual seed planting unit 108 includes a visual indicator 416 associated therewith. Each visual indicator 416 may correspond 1:1 with a particular seed planting unit 108. Generally, the visual indicators 416 may be arranged similarly as the visual indicators 406, or may be arranged differently. According to at least one embodiment, the visual indicators 406 and 416 are visual indicators powered by LEDs capable of illuminating in several colors. Thus, each color may represent one or more states of a seed planting unit 108, a group of seed planting units 108, or a sub-control unit 404. It is noted that the visual indicators 406 and 416 may be substantially similar to the visual indicators 241 described above.

During operation, the visual indicators 406 and 416 may be illuminated in any manner by which to alert an operator of the status of depth control operations and depth adjustment operations of any associated seed planting unit. For example, visual indicators 406 may be illuminated when a particular sub-control module or group of seed planting units 108 are selected by an operator. Similarly, visual indicators 416 may be illuminated when any associated individual seed planting unit 108 is selected by an operator.

As one example, an operator may select a first seed planting unit 108 for depth adjustment. Upon selection, the visual indicator 416 may illuminate showing the operator exactly which seed planting unit 108 has been selected. An appropriate illumination color may include flashing green. Thereafter, the operator may enter a new depth setting for the selected seed planting unit 108. Upon receipt of the new setting and during depth adjustment, the visual indicator 416 may illuminate showing the operator that a depth adjustment operation is underway. An appropriate illumination color may include flashing yellow. Upon termination or successful adjustment of the depth setting for the seed planting unit 108, the visual indicator 416 may also illuminate to indicate that the adjustment operation was successful or was unsuccessful. An appropriate illumination color for a successful adjustment may include solid green, indicating a good status. An appropriate illumination color for an unsuccessful adjustment may include solid yellow, indicating an imperfect status. Somewhat similarly, solid red or flashing red may be used to indicate a fault or issue of greater concern to the operator. It should be understood that other illumination patterns and visual indication patterns may also be used without departing from the scope of this disclosure.

As explained above, visual indicators 406 and 416 arranged physically on an agricultural implement may provide an operator with a visual indication of the depth adjustment status of one or more seed planting units 108. Somewhat similarly, virtual visual indicators provided on a graphical user interface may also provide a visual indication of the status of one or more seed planting units 108.

Figure 5:
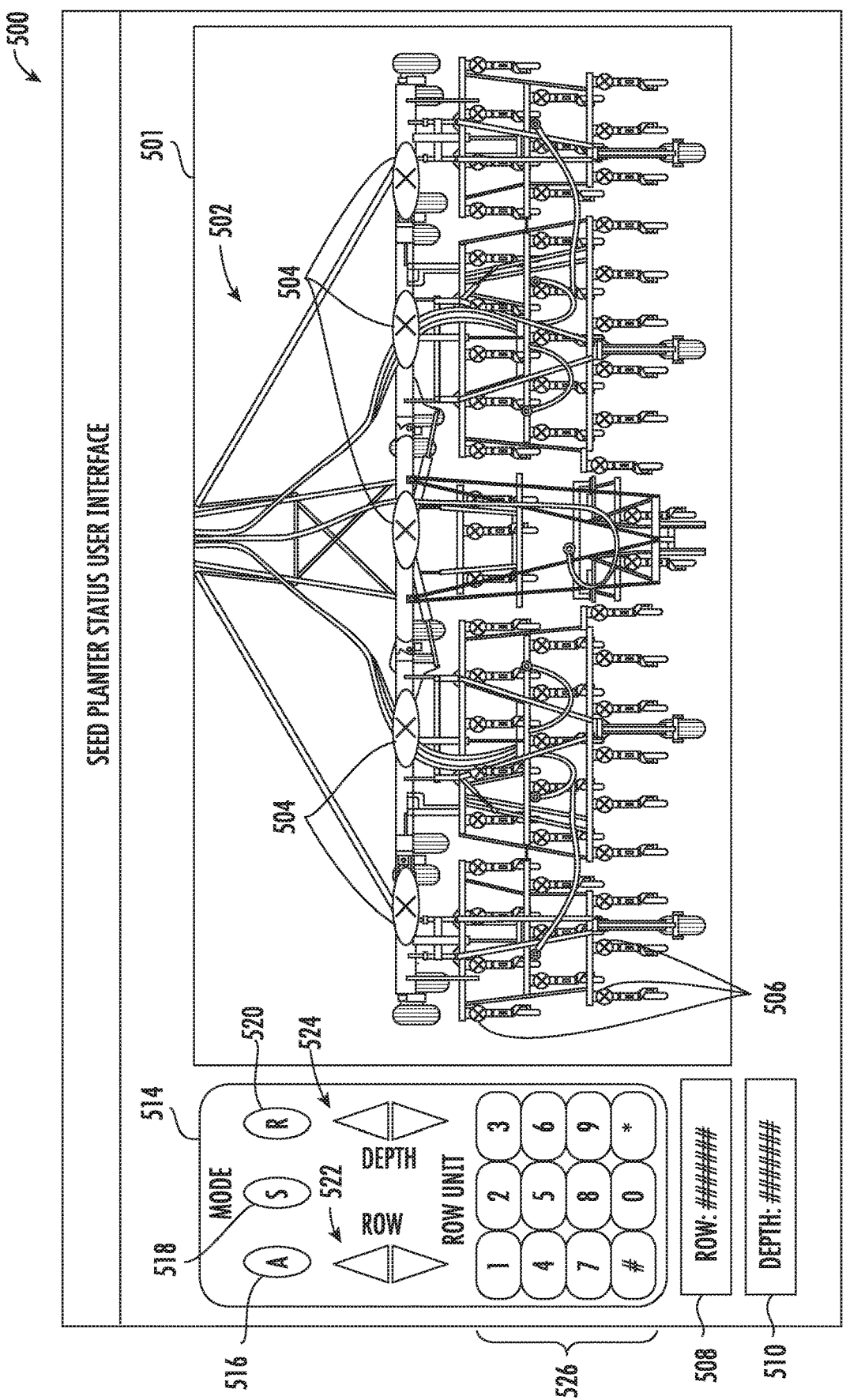
FIG. 5 illustrates an example view of one embodiment of a graphical user interface of an agricultural implement in accordance with aspects of the present subject matter.

FIG. 5 illustrates a graphical user interface 500 of an agricultural implement in accordance with aspects of the present subject matter. The user interface 500 may include a main interface panel 501 representative of the status of the agricultural implement. As shown, a graphical representation 502 of an agricultural implement may be rendered having visual indicators 504 and 506 representative of the physical visual indicators 406 and 416, respectively, described above with reference to FIG. 4. Thus, the visual indicators 504 and 506 may change color, flash, or otherwise visually indicate a status of the physical agricultural implement from within the main interface panel 501.

As further illustrated, the user interface 500 includes a remote control interface 514 to allow control of individual seed planting units 108 and/or selected groups of seed planting units. The remote control interface may include mode selection inputs 516, 518, and 520 allowing for selection of "ALL UNITS," a "SECTION" of units, or individual "ROWS", respectively. According to one example, mode selection inputs 516, 518, and 520 may trigger visual indication in the panel 501 of particular seed planting units that have been selected. For example, a selection of input 516 may illuminate all indicators 506 to indicate to the operator that all units have been selected. Similarly, any seed planting units with faults may be indicated in red. Additionally, a selection of input 518 may illuminate visual indicators 504 of a particular sub-group of seed planting units 108 in the interface panel 501 and/or individual indicators 506. For example, the various seed planting units 108 may be sub-divided into predetermined groups (e.g., across the lateral width of the implement). In such an embodiment, each actuation of input 518 may change which of the particular sub-groups is currently selected. Finally, a selection of input 520 may illuminate a particular seed planting unit 108 such that the operator can discern a seed planting unit being adjusted through the interface 500.

As further illustrated, depth adjustment data inputs 522 and 524 allow for increasing and decreasing a value of a row unit selected or a depth adjustment setting. For example, selection of the input 522 may adjust the visual indication of the indicators 506 provided within the interface to show an operator 'traversing' different seed planting units 108 until a desired seed planting unit 108 is selected. Similarly, selection of the input 524 may provide a flashing yellow visual indication that a particular seed planting unit or group of seed planting units 108 are being actively adjusted.

As further illustrated, keypad interface 526 may allow for direct entry of seed planting unit data including depth adjustment data, while numerical panels 508 and 510 may provide data about a particular selected unit(s) and current depth adjustment settings, respectively. Upon entry of a desired seed planting unit using the keypad interface 526, the associated seed planting unit 108 may be indicated using the associated indicator 506. Similarly, upon entry of a desired depth setting using the keypad interface 526, the visual indicator 506 of the associated seed planting unit 108 may illuminate to indicate the depth adjustment operation and/or result of the depth adjustment operation.

Figure 6:
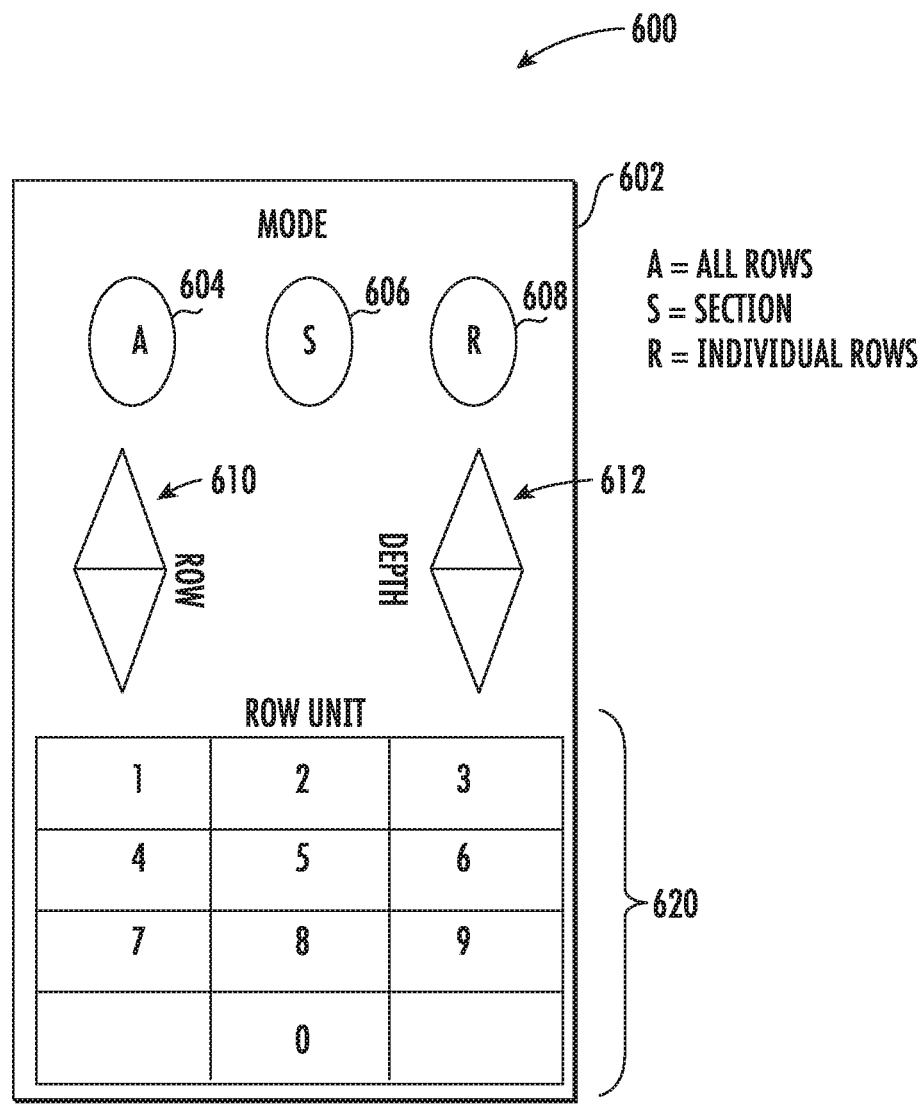
FIG. 6 illustrates an example view of one embodiment of a remote control unit configured for use with an agricultural implement in accordance with aspects of the present subject matter.

It is noted that although use of a graphic user interface allows for precise control of depth settings for each individual seed planting unit 108, a physical remote control or human-machine interface may also be provided to allow the operator to execute depth adjustments. For example, FIG. 6 illustrates one embodiment of a remote control unit 600 configured for use within an agricultural implement in accordance with aspects of the present subject matter. The remote 600 may include a main body 602 having a plurality of physical buttons, toggles, or interfaces presented thereon. For example, mode selection buttons 604, 606, and 608 provide mode control settings. Furthermore, row and depth adjustment buttons 610 and 612 allow for increasing and decreasing a row selection and depth, respectively. Finally, keypad 620 allows for direct entry of numerical values.

It is noted that visual indication of visual indicators 406 and 416 while entering depth adjustment data via the remote 600 provides for a comprehensive and intuitive adjustment system that allows for precise control of the depth of seed planting units 108. For example, and somewhat similarly to the operations of the GUI interface 514 discussed above, selection of the keys of the remote 600 result in indication of seed planting units via the indicators 406 and 416. The indications can change based on key presses to show exactly which seed planting unit 108 or groups of seed planting units are being adjusted. Furthermore, seed planting units can be traversed quickly through multiple key presses with visual indicators being illuminated and de-illuminated based on an actively selected seed planting unit or group of seed planting units.

For example, an operator may initially select key 608 to find a particular seed planting unit to adjust. Thereafter, with each depression up/down on 610, a particular visual indicator 416 illuminated on the implement moves to the next adjacent unit so that the operator can look back at his implement and determine via the indicator(s) 416 which unit(s) 108 has been selected. The operator can then adjust the depth setting for the selected unit(s) (e.g., using 612).

Similarly, groups of units may be selected and adjusted using mode selection 606 with appropriate visual indicators 406 and 416 being illuminated to indicate which section has been selected. Finally, all units may be illuminated and indicated using indicators 416 when key 604 is depressed, showing the operator that all seed planting units 108 have been selected for adjustment. In each of these scenarios, use of the up/down interface 612 results in differing visual indication (such as flashing green or yellow indicators 416) to indicate that a depth adjustment operation is underway. Additionally, solid red or flashing red indicators may communicate varying degrees of faults or errors in the depth adjustment system or individual components and seed planting units 108.

Figure 7:
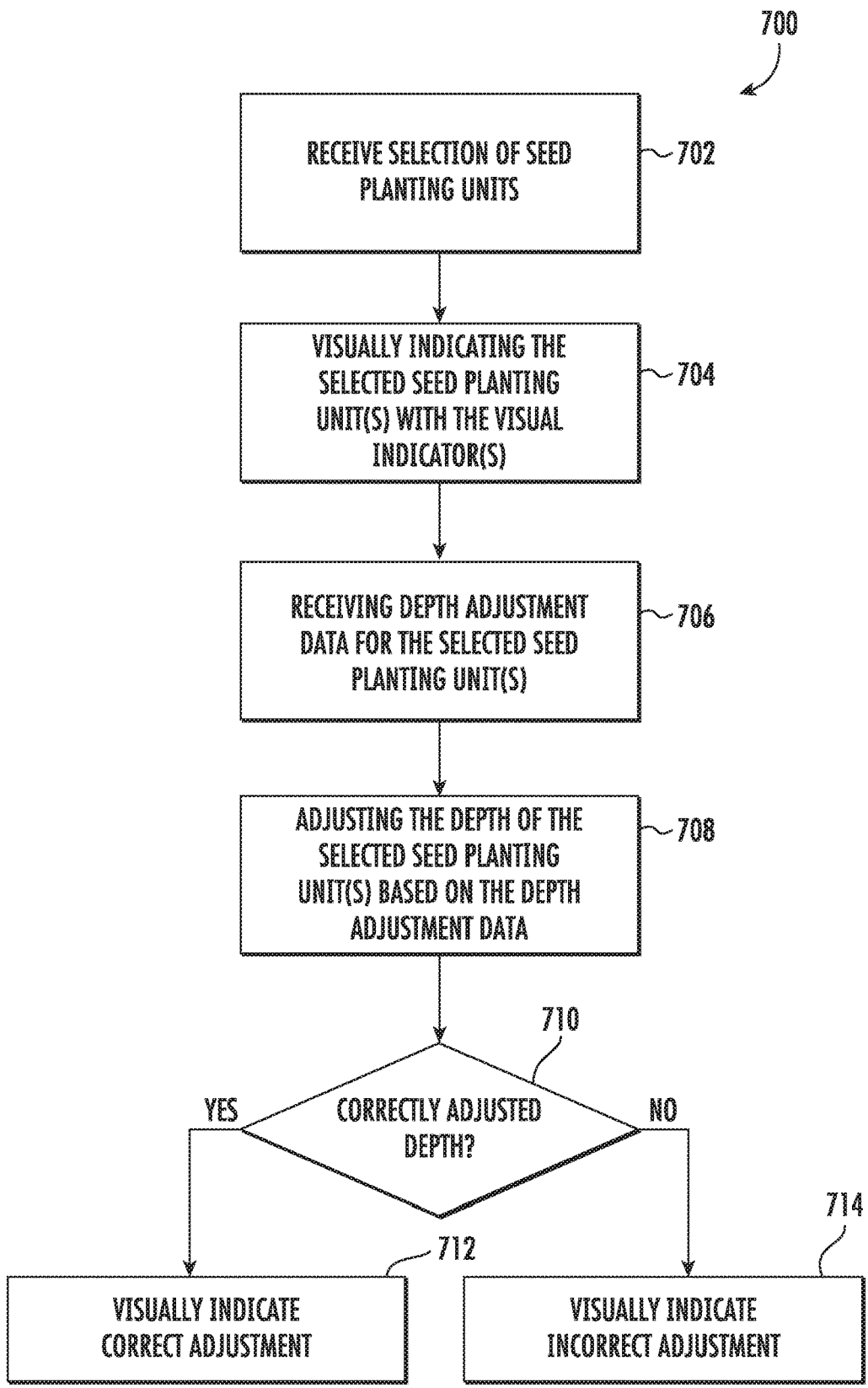
FIG. 7 illustrates a flowchart of one embodiment of a method of precision depth control of seed planting units of an agricultural implement, such as the agricultural implement of FIG. 1 and FIG. 4, in accordance with aspects of the present subject matter.

FIG. 7 illustrates a flowchart of a method 700 of precision depth control of seed planting units of an agricultural implement, such as the agricultural implement of FIG. 1 and FIG. 4, in accordance with aspects of the present subject matter. The method 700 includes receiving a selection of one or more seed planting units of the plurality of seed planting units at block 702. The selection may be input via the graphical user interface 500 or the remote 600. Other forms of selection may also be applicable, including physically depressing a visual indicator or button physically present on a seed planting unit.

The method 700 further includes visually indicating the selected seed planting unit(s) with the visual indicator associated therewith, at block 704. For example, a lamp or LED located at or adjacent to each selected seed planting unit may be energized to visually indicate the unit(s). Similarly, the graphical user interface 500 and main panel 501 may be altered to show which seed planting unit or units have been selected.

The method 700 also includes receiving depth adjustment data for the selected seed planting unit, at block 706. The depth adjustment data may be input via a physical or virtual keypad, may be input using increase/decrease buttons 612, or otherwise input. The depth adjustment data may also be set as a default or reset value in some circumstances.

The method 700 further includes adjusting the depth of the selected seed planting unit or units based on the depth adjustment data, at block 708. For example, an associated actuator 200 may actuate and move an associated depth adjustment lever 201 along arcuate slot 203 until the desired depth setting is reached. Thereafter, the actuator 200 may lock into or otherwise retain its position. Other depth adjustment operations may also be applicable if a differing depth adjustment system is utilized. For example, actuation of a stepper motor or movement of a worm gear may also adjust the depth in some scenarios.

In some embodiments, the method 700 includes determining that the depth of the selected seed planting unit has been correctly adjusted, at block 710. For example, the depth control system 230 of each seed planting unit 108 may provide feedback as to the actual physical position of the actuator 200, the lever 201, or another component. The feedback may be provided by a sensor, such as position sensor 209. Thereafter, a successful and correct adjustment may be visually indicated at block 712 while an incorrect or unsuccessful depth adjustment may be visually indicated at block 714. For example, visual indication can include any of the examples provided above, including flashing yellow for indicating a current depth adjustment operation, solid green to indicate a successful depth adjustment, and/or solid or flashing red to indicate a fault or incorrect adjustment. These visual indications may allow an operator to readjust the associated seed planting unit until a successful depth adjustment operation is performed.

As described above, a plurality of systems and methods for precision depth control of seed planting units have been described. The systems and methods may be facilitated through an input device, a depth control system, and a plurality of seed planting units. The depth control system may include a plurality of components, including visual indicators and a computer apparatus. The computer apparatus may be a general or specialized computer apparatus configured to perform various functions related to calculating depth and determining that an appropriate depth has been adjusted/set.

Figure 8:
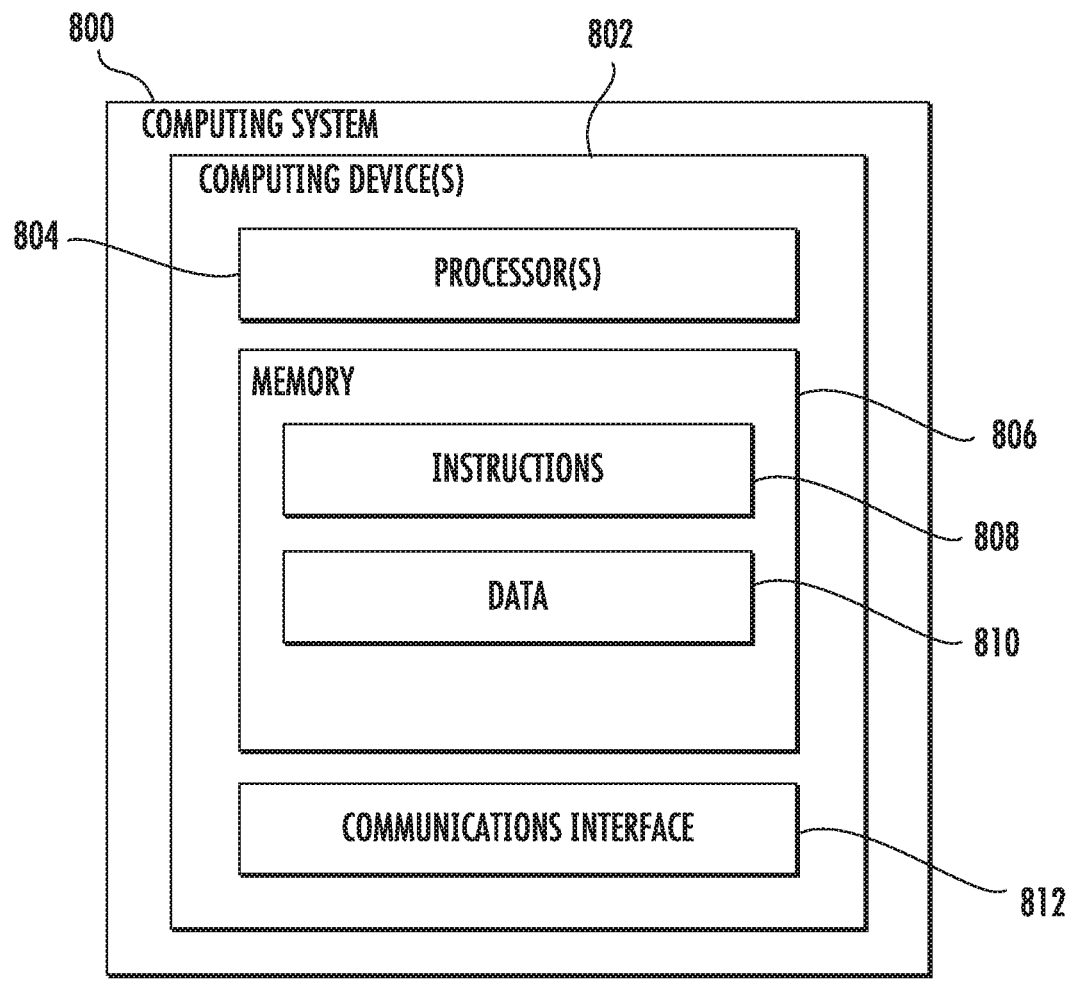
FIG. 8 illustrates a block diagram of an example computing system that can be used to implement methods in accordance with aspects of the present subject matter.

For example, FIG. 8 depicts a block diagram of an example computing system 800 that can be used to implement one or more components of the systems according to example embodiments of the present disclosure. As shown, the computing system 800 can include one or more computing device(s) 802. The one or more computing device(s) 802 can include one or more processor(s) 804 and one or more memory device(s) 806. The one or more processor(s) 804 can include any suitable processing device, such as a microprocessor, microcontroller, integrated circuit, logic device, or other suitable processing device. The one or more memory device(s) 806 can include one or more computer-readable media, including, but not limited to, non-transitory computer-readable media, RAM, ROM, hard drives, flash drives, or other memory devices.

The one or more memory device(s) 806 can store information accessible by the one or more processor(s) 804, including computer-readable instructions 808 that can be executed by the one or more processor(s) 804. The instructions 808 can be any set of instructions that when executed by the one or more processor(s) 804, cause the one or more processor(s) 804 to perform operations. The instructions 808 can be software written in any suitable programming language or can be implemented in hardware. In some embodiments, the instructions 808 can be executed by the one or more processor(s) 804 to cause the one or more processor(s) 804 to perform operations, such as the operations for precision depth control of seed planting units, as described with reference to FIG. 7.

The memory device(s) 806 can further store data 810 that can be accessed by the processors 804. For example, the data 810 can include prior depth adjustment data, current depth adjustment data, faulty seed planting unit data, operational seed planting unit data, user interface wireframes or graphical data, and other suitable data, as described herein. The data 810 can include one or more table(s), function(s), algorithm(s), model(s), equation(s), etc. for precisely adjusting the depth of one or more seed planting units according to example embodiments of the present disclosure.

The one or more computing device(s) 802 can also include a communication interface 812 used to communicate, for example, with the other components of the system and/or other computing devices. The communication interface 812 can include any suitable components for interfacing with one or more network(s), including for example, transmitters, receivers, ports, controllers, antennas, or other suitable components.

The technology discussed herein makes reference to computer-based systems and actions taken by and information sent to and from computer-based systems. One of ordinary skill in the art will recognize that the inherent flexibility of computer-based systems allows for a great variety of possible configurations, combinations, and divisions of tasks and functionality between and among components. For instance, processes discussed herein can be implemented using a single computing device or multiple computing devices working in combination. Databases, memory, instructions, and applications can be implemented on a single system or distributed across multiple systems. Distributed components can operate sequentially or in parallel.

Although specific features of various embodiments may be shown in some drawings and not in others, this is for convenience only. In accordance with the principles of the present disclosure, any feature of a drawing may be referenced and/or claimed in combination with any feature of any other drawing.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A method of precision depth control for seed planting units of an agricultural implement, the agricultural implement comprising a plurality of seed planting units, each seed planting unit being configured to provide an individually adjustable depth setting and having a visual indicator located thereon, the method comprising:
   receiving a selection of a seed planting unit of the plurality of seed planting units;
   visually indicating the selected seed planting unit with a first visual indication on the visual indicator located on the selected seed planting unit;
   receiving depth adjustment data for the selected seed planting unit;
   adjusting the depth of the selected seed planting unit based on the depth adjustment data;
   during adjustment of the depth of the selected seed planning unit, visually indicating with a second visual indication on the visual indicator located on the selected seed planting unit; and
   visually indicated with a third visual indication on the visual indicator located on the selected seed planning unit after adjustment of the depth of the selected seed planning unit is complete.

2. The method of claim 1, wherein visually indicating with the first, second and third visual indications comprises illuminating the visual indicator located on the selected seed planting unit with a particular color.

3. The method of claim 1, further comprising:
   determining that the depth of the selected seed planting unit has been correctly adjusted; and
   visually indicating with the third visual indication on the visual indicator located on the selected seed planning unit is responsive to determining that depth of the selected seed planting unit has been correctly adjusted.

4. The method of claim 3, wherein visually indicating with the third visual indication comprises illuminating the visual indicator located on the selected seed planting unit with a particular color.

5. The method of claim 1, wherein:
   the seed planting unit comprises one of a subset of seed planting units of the plurality of seed planting units and each subset of seed planting units having a visual indicator located thereon;
   receiving the selection comprises receiving a selection of the subset of seed planting units;
   visually indicating the selected seed planting unit comprises visually indicating the selected subset of seed planting units with at least one of the visual indicators located thereon;

receiving depth adjustment data comprises receiving depth adjustment data for the selected subset of seed planting units; and adjusting the depth comprises adjusting the depths of the selected subset of seed planting units based on the depth adjustment data.

6. The method of claim 5, further comprising:

determining that the depths of the selected subset of seed planting units has been correctly adjusted; and visually indicating the correct adjustment of the selected subset of seed planting units with the visual indicators located thereon.

7. The method of claim 5, wherein the selected subset comprises one of a plurality of predetermined subsets of seed planting units.

8. The method of claim 1, further comprising:

determining that the depth of the selected seed planting unit has been incorrectly adjusted; and visually indicating with a fourth visual indication on the visual indicator located on the selected seed planning unit is responsive to determining that depth of the selected seed planting unit has been incorrectly adjusted.

9. The method of claim 8, further comprising:

readjusting the depth of the selected seed planting to a default depth or a depth within a margin of error of the depth adjustment data.

* * * * *